United States Patent
Higginbotham et al.

[11] Patent Number: 6,065,310
[45] Date of Patent: May 23, 2000

[54] HIGH THROUGHPUT GLASS FIBERIZING SYSTEM AND PROCESS

[75] Inventors: James Melvin Higginbotham, Newark; Richard Francis Finck, Granville; James Donald Keck, Newark; Michael Walden Morrison, Newark; Michael Blaise Fazio, Newark; David Tilton Mercer, Newark, all of Ohio

[73] Assignee: Owens Corning Fiberglas Technology, Inc., Summit, Ill.

[21] Appl. No.: 09/318,510

[22] Filed: May 25, 1999

Related U.S. Application Data

[63] Continuation of application No. 09/108,883, Jul. 1, 1998, abandoned.

[51] Int. Cl.[7] .................................................. C03B 37/085
[52] U.S. Cl. ........................... 65/488; 65/474; 65/495; 65/499; 65/502
[58] Field of Search ........................... 65/474, 495, 502, 65/499, 488

[56] References Cited

U.S. PATENT DOCUMENTS

| | | |
|---|---|---|
| 1,989,575 | 1/1935 | Honiss . |
| 2,360,373 | 10/1944 | Tiede ............................................ 65/499 |
| 2,460,547 | 2/1949 | Stevens . |
| 2,465,283 | 3/1949 | Schlehr ........................................ 65/495 |
| 2,482,299 | 9/1949 | Stevens . |
| 2,485,851 | 10/1949 | Stevens . |
| 3,401,536 | 9/1968 | Glaser ........................................... 65/495 |
| 3,556,753 | 1/1971 | Glaser ........................................... 65/495 |
| 3,810,741 | 5/1974 | Stalego . |
| 3,981,704 | 9/1976 | Fournier et al. . |
| 3,988,135 | 10/1976 | Coggin, Jr. ................................... 65/474 |
| 4,023,950 | 5/1977 | Glaser . |
| 4,026,689 | 5/1977 | Higginbothem ........................... 65/499 |
| 4,264,348 | 4/1981 | Sullivan . |
| 4,325,721 | 4/1982 | Jensen . |
| 4,436,541 | 3/1984 | Pellegrin et al. . |
| 4,537,609 | 8/1985 | McEathron ................................. 65/495 |
| 4,559,072 | 12/1985 | Harcuba . |
| 4,612,027 | 9/1986 | Marra . |
| 4,875,917 | 10/1989 | Lentz . |
| 4,897,100 | 1/1990 | Nice . |
| 5,352,258 | 10/1994 | DeGreve et al. . |
| 5,417,732 | 5/1995 | Shamp et al. . |
| 5,618,328 | 4/1997 | Lin et al. . |
| 5,928,402 | 7/1999 | Mirth et al. ................................. 65/495 |

FOREIGN PATENT DOCUMENTS

| | | |
|---|---|---|
| 632507 | 12/1961 | Canada . |
| 562518 | 6/1977 | U.S.S.R. . |
| 610808 | 6/1978 | U.S.S.R. . |
| 998399 | 2/1983 | U.S.S.R. . |
| 1710528 | 2/1992 | U.S.S.R. . |
| WO 96/38392 | 12/1996 | WIPO . |

*Primary Examiner*—James Derrington
*Attorney, Agent, or Firm*—Inger H. Eckert

[57] ABSTRACT

This invention relates to a high throughput glass fiber production system and process to provide optimum glass delivery to the glass fiberizing bushing and enhanced glass production of textile fibers or filaments of glass. The fiberizing system includes dual melters which feed the molten glass through various screens within a high throughput feed bushing positioned below the melters to reduce seeds and condition the glass. The feed bushing directs the molten glass into a dual flow diverter for supplying the molten glass into the optimum location of the glass fiberizing bushings placed below the dual flow diverter.

14 Claims, 4 Drawing Sheets

HIGH THROUGHPUT GLASS FIBERIZING SYSTEM AND PROCESS

CROSS REFERENCE TO RELATED APPLICATION(S)

This is a continuation of U.S. patent application Ser. No. 09/108,883, filed Jul. 1, 1998, now abandoned and is related to U.S. patent application Ser. No. 08/905,496, filed Aug. 4, 1997 now U.S. Pat No. 5,928,402.

TECHNICAL FIELD AND INDUSTRIAL APPLICATION OF THE INVENTION

This invention relates to a high throughput glass fiberizing system and process. More particularly, this invention relates to a high throughput glass fiber production system and process to provide optimum glass delivery to the glass fiberizing bushing and enhanced glass production of textile fibers or filaments of glass. The fiberizing system comprises a spaced pair of electric melters for supplying and regulating the amount of heat supplied to the melters to maintain the molten glass at a desired temperature. The melters feed the molten glass through various screens within a feed bushing positioned below the melters to reduce seeds and condition the glass. The feed bushing directs the molten glass into a dual flow diverter through which the molten glass may be diverted into the fiberizing bushings in the optimum location. A solid insulating material panel structure envelopes the melters and feed bushing and includes fluid circulating therethrough for regulating cooling.

BACKGROUND OF THE INVENTION

Convention glass melting and refining furnaces and forehearth constructions in general include combination melter and bushing constructions for melting pieces of prerefined glass. The molten glass is passed through a fiberizing bushing which contains orifice tips through which the molten glass flows to produce fibers of a given diameter. The bushing through which the fibers are drawn is generally located on the underside of the forehearth which is connected to the glass refining furnace.

In a typical melt operation, a suitable glass batch is fed to a large melting tank which is provided with a melting zone and a refining zone. The glass is melted within a melting tank by the application of a suitable heat source. After passage through the refiner, the melted glass is fed through a plurality of bushings that are connected to the bottom forehearth.

Large production of glass fibers require many melting tanks for supplying glass to a large number of bushings associated with the forehearth construction. Conventional melters and bushings employed for processing glass for forming filaments occupy considerable space, are costly to install, and often produce seeds which disrupt proper formation of the glass filaments.

In accordance with the present invention, considerable improvement is realized in glass filament production by replacing the conventional melt operation with a three stage process. Stage one includes dual melters to allow a higher throughput capability and glass composition change via mixing of the melt. Stage two comprises a feed bushing that is designed to accept feed from the dual melters. The feed bushing is provided with screens secured near the top thereof and located below the dual melters. The screens remove seeds and condition the glass melt as it passes to the third stage, i.e. delivery stage, which incorporates a diverter for directing the glass melt flow to the fiberizing bushings in the optimum location with all three units, i.e. the dual melters, feed bushing, and diverter itself, being firmly attached one to the other so that no glass leakage can occur between the adjacent units during the flow of glass from the melters to the bushing tips associated with the fiberizing bushing.

SUMMARY OF THE INVENTION

The present invention relates to a high throughput glass fiberizing system and process to provide optimum glass delivery to the glass fiberizing bushing and enhanced glass production of textile fibers or filaments of glass.

The present high throughput glass fiber production system utilizes a three stage process which includes a melting, conditioning, and a delivery stage. The melting stage of the fiberizing system comprises a spaced pair of electric melters for supplying a high throughput of molten glass to a feed bushing positioned below the dual melters. A probe level stack is attached to the melters and includes a sensor for regulating the amount of heat supplied to the melters to maintain the molten glass at a desired temperature.

The feed bushing is adapted to receive two separate molten glass streams from the melters and to condition the molten glass as it is fed through the feed bushing. Conditioning of the molten glass is initially obtained as the glass passes through various screens within the upper section of the feed bushing. The screens reduce seeds and condition the glass through the benefit of localized heating, flow control, and increased volume of molten glass supplied by the dual melters. As the conditioned glass flows through the screens, the molten glass streams are combined into a composite glass feed stream in the lower section of the feed bushing. The lower section of the feed bushing comprises a pair of walls creating a vertical mixing zone for shear mixing of the molten glass.

The final stage of the present invention is the delivery stage in which the feed bushing directs the molten glass stream from the feed bushing into a dual flow diverter through which the molten glass is diverted into the optimum location of fiberizing bushings positioned below the feed bushing.

Accordingly, it is a feature of the present invention to provide a high throughput glass fiberizing system and process for optimum glass delivery to the glass fiberizing bushing and enhanced glass production of textile fibers or filaments of glass. This, and other features and advantages of the present invention will become apparent from the following detailed description, the accompanying drawings, and the appended claims.

BRIEF DESCRIPTION OF THE DRAWINGS

Further features and other objects and advantages of this invention will become clear from the following detailed description made with reference to the drawings in which.

DETAILED DESCRIPTION AND PREFERRED EMBODIMENTS OF THE INVENTION

Figure 1:
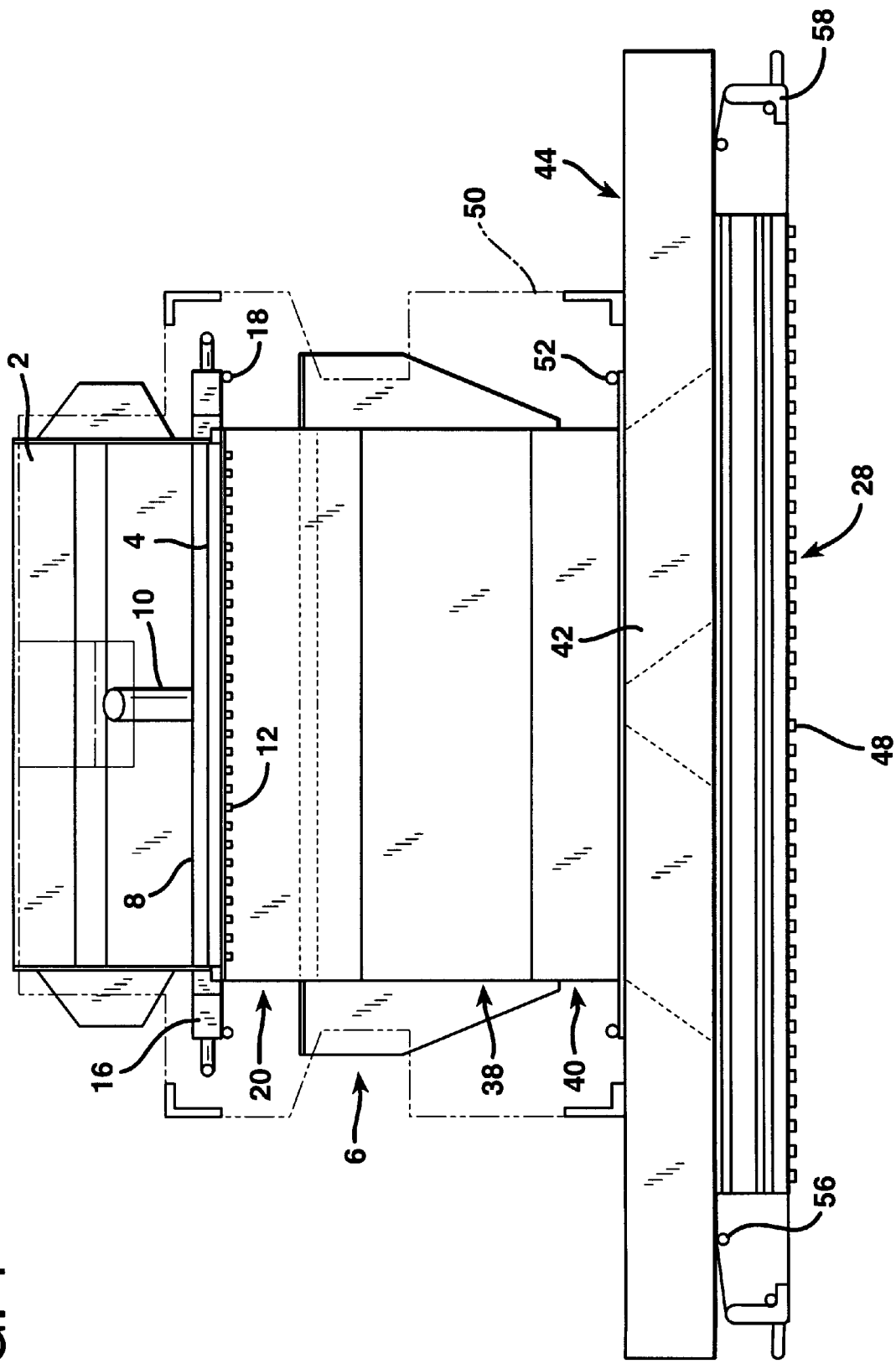
FIG. 1 is a front elevated view of the glass fiberizing system in accordance with the present invention.
Figure 2:
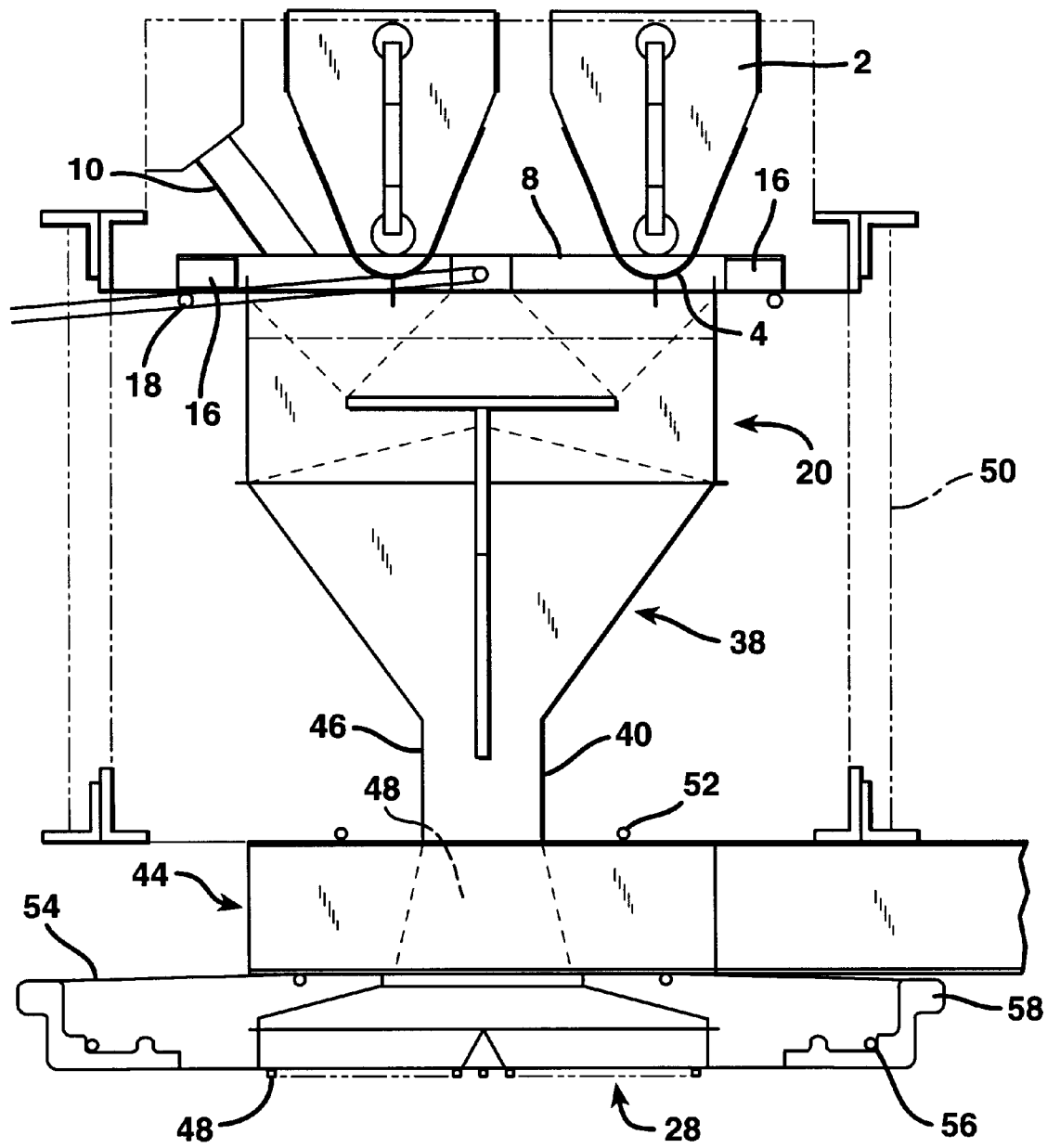
FIG. 2 is a side elevated view of the glass fiberizing system in accordance with the present invention.

Referring to FIGS. 1 and 2, a high throughput fiberizing system typically includes a pair of melters 2, such as a conventional gas fired glass furnace, an oil fired furnace or an electric melter, having at an exit end thereof a refining section 4 through which molten glass from the melter flows on its way to a feed bushing 6. The feed bushing 6 is shown as having a generally rectangular opening and having essentially two plate members 8 (shown in FIG. 3) extending over the opening. The plate members 8 are provided with openings in which the melters 2 are operatively supported on the underside thereof Thus, the feed bushing 6 as shown in the figures, is capable of receiving molten glass from dual melters 2. It will be appreciated that the selection of feed bushing shape and number of melters is for illustrative purposes only, it being understood that the feed bushing arrangement can be altered without any departure from the instant invention.

The plate member 8 used to support the melters 2 is configured to receive a probe level stack 10 capable of receiving a commercially available temperature detector suitable for measuring the high temperatures of the molten glass as it enters the feed bushing 6. It will be appreciated that direct measurements at the feed bushing 6 reflects the temperature of the glass at the outlet of the melters 2. These temperature measurements can be utilized to selectively control the heating of the melters 2 and thus obtain the desired temperature of the molten glass.

Figure 3:
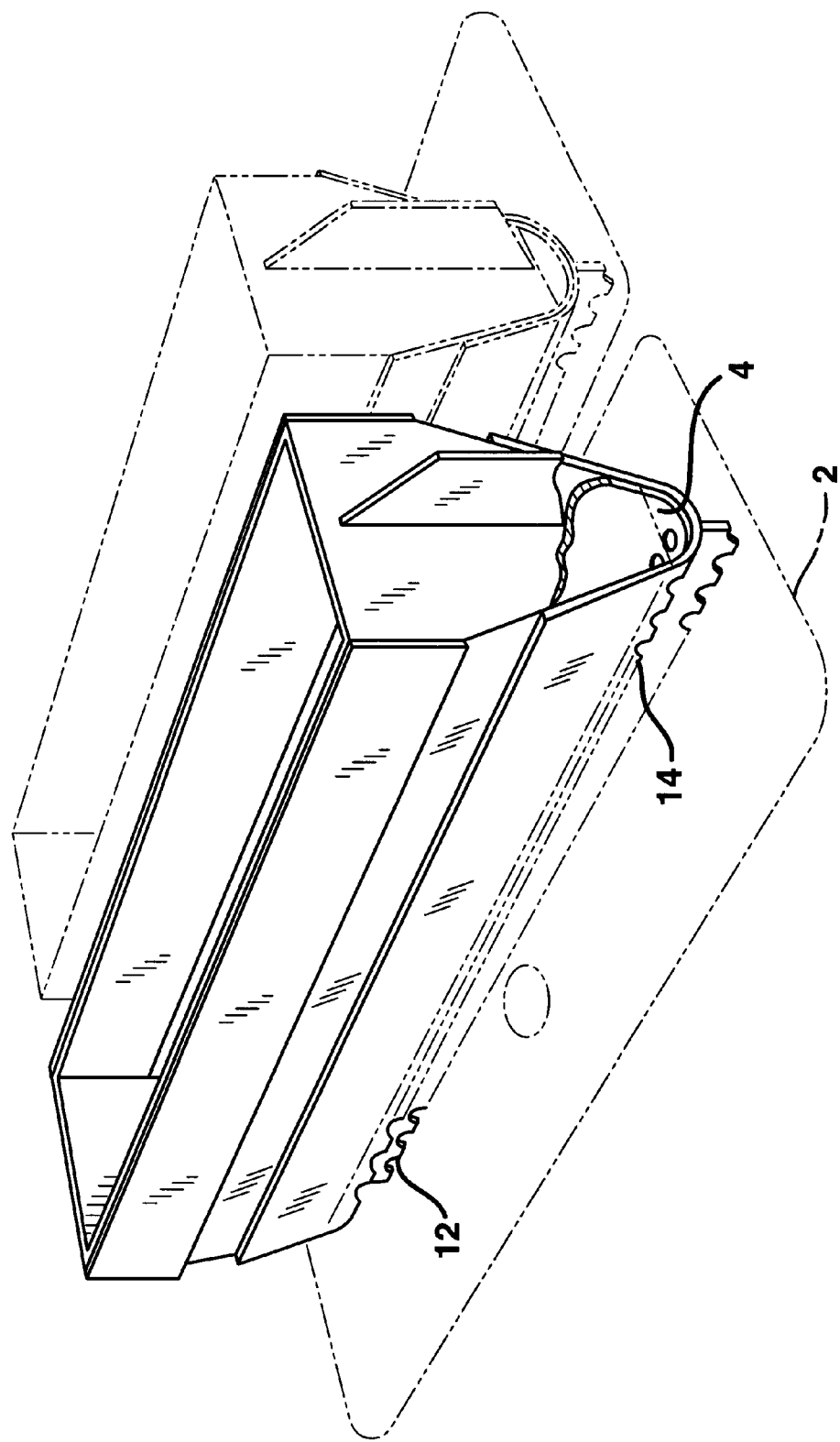
FIG. 3 is a perspective view of the dual melters constructed in accordance with the present invention.

As shown in FIGS. 1 and 3, a scallop plate 12 is attached to the bottom of the melters 2 in a conventional manner and define a series of partial annular segments projecting into the feed bushing 6. The scallop plate 12 is centrally displaced between a plurality of openings 14 in the bottom of the melters 2 as shown in FIG. 3 and thus communicates with a source (not shown) of molten glass flowing from the openings 14 of the melters 2. The configuration of the annular segments of the scallop plate 12 creates a substantially uniform, distally directed melt flow of molten glass into the feed bushing 6.

Insulation blocks 16 insulate and support plate members 8 from the feed bushing 6. Adjacent the insulating blocks 16 is secured water cooling members 18 for additional cooling as necessary. With this arrangement, thermal stresses which typically occur as a result of locally occurring temperature differences within the melters 2 and plate members 8 are taken up by the cooling members 18.

Figure 4:
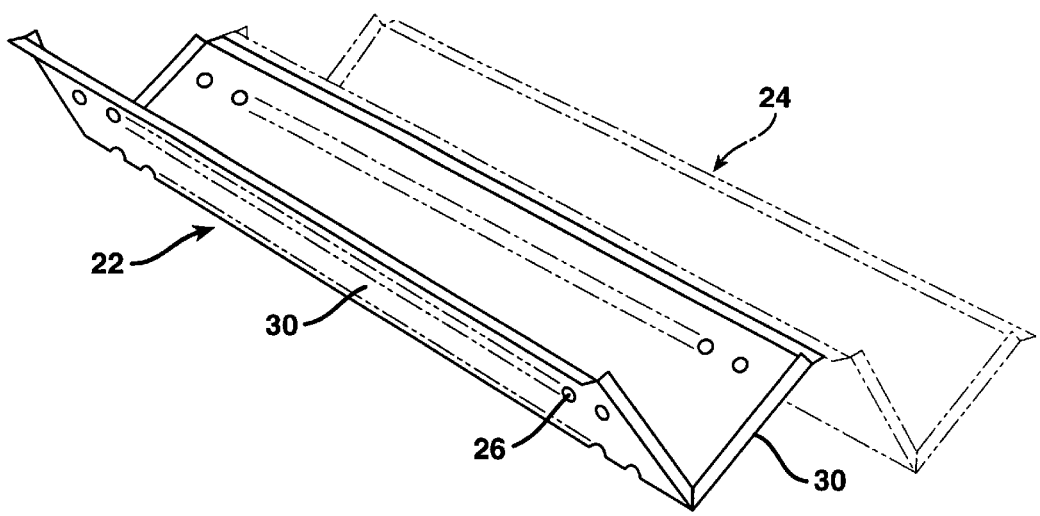
FIG. 4 is a perspective view of the glass conditioning screen in accordance with the present invention.

Below the insulating blocks 16 lies the upper portion 20 of the feed bushing 6. Positioned in the upper portion 20 of the feed bushing 6 are screen members 22 and 24. The screen members 22 are provided with a plurality of openings 26 (FIG. 4) through which the molten glass must flow as it passes from the melters 2 to the fiberizing bushing 28. As shown in FIG. 2, screens 22 and 24 are positioned below and adjacent melters 2 and may be generally formed in a V-shape fashion in cross section with planar side walls 30 angularly joined, one with respect to the other. These screen members 22 and 24 may be constructed of a heat resistant material and serve as an initial filter, preventing the movement of solid or quasi-solid particulate matter to downstream locations.

Figure 5:
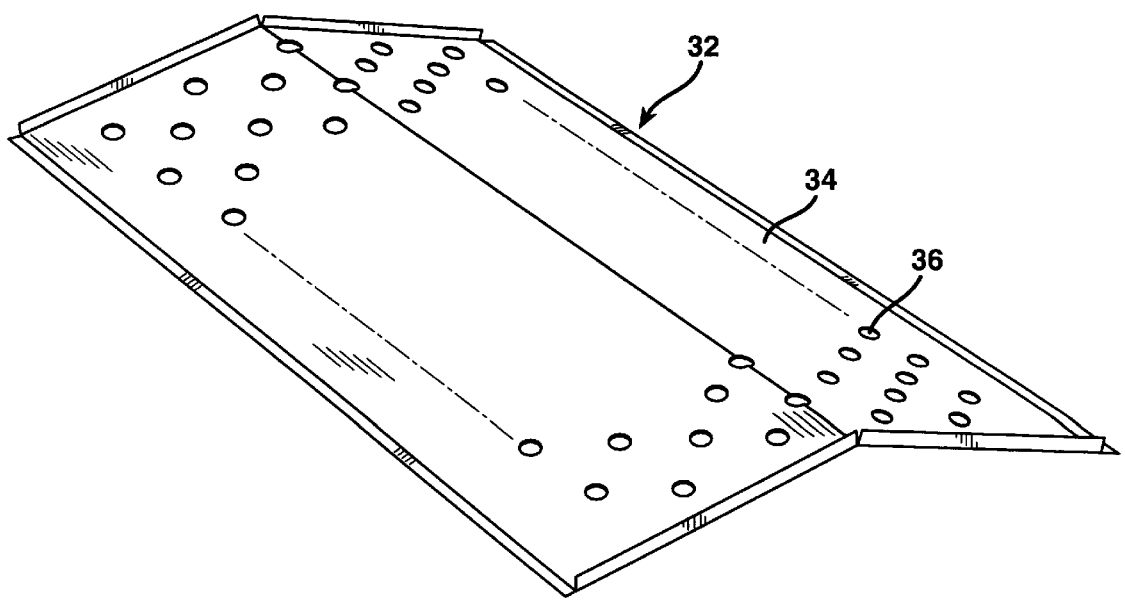
FIG. 5 is a perspective view of the glass conditioning screen in accordance with the present invention.

Disposed below the screen members 22 and 24 is an additional screen member 32 (shown in FIG. 5) which may be formed in a V-shaped fashion in cross section with planar side walls 34 angularly joined, one with respect to the other. The screen member 32 may be constructed of a heat resistant material and is provided with a plurality of openings 36 therein. Screen members 22, 24, and 32 serve as coarse filters, arresting the movement of particles of solid or quasi-solid hot melt materials further downstream and serving to further condition the melt as it passes into the mid portion 38 of the feed bushing 6.

The screen members 22, 24 and 32, according to the present invention, may be arranged in other configurations to accommodate the opening of the upper portion 20 of feed bushing 6. For example, the screen members 22, 24 and 32 may have a square or rectangular cross section and the side walls of screen members 22, 24 and 32 may be of a one-piece construction formed from a single sheet of metal or of separate sheets of metal joined together.

Leading from the upper portion 20 of feed bushing 6 is mid portion 38 beveled to provide a slight incline to the lower portion 40, which is shown in the figures as having an elongated, generally rectangular shaped opening which mates with a similar openings to canals 42 formed in a diverter 44 positioned immediately below the feed bushing 6. The mid portion 38 and lower portion 40 of the feed bushing 6 include side walls 46 creating a generally vertical mixing zone for shear mixing of the molten glass as the molten glass passes to the diverter 44.

A fiberizing bushing 28 is attached to the underside of the diverter 44 and is of a conventional design well known in the art. The fiberizing bushing 28 is provided with a central opening that is in communication with the openings of the diverter 44. The bottom of the fiberizing bushing 28 is provided with a plurality of orifices 48 through which the molten glass flows and is attenuated into fibers.

As shown in FIGS. 1 and 2, a solid insulating material panel structure 50 envelopes the melters 2 and feed bushing 6 and includes fluid cooling tubes 52 with fluid circulating therethrough for regulating cooling. An insulating material panel structure 54 may be used to envelope the fiberizing bushings 28 with fluid cooling tubes 56 as needed which are held in place by a bushing frame b.

The high throughput fiberizing system as shown in FIGS. 1 and 2 may be operated as follows. The melters 2 are generally operated at a controlled temperature by the application of suitable electric current to the melters themselves based upon the measurements obtained via a suitable temperature probe installed within the probe level stack 10. It will be appreciated that the electrical system associated with the melters 2 is not shown in the drawings since this is a conventional method of heating melters that is utilized in the industry in the manufacture of fiber glass.

A molten stream is supplied from the melters 2 and discharged through the openings 14 in the bottom section of the melters. The configuration of the annular segments of the scallop plate 12 creates a substantially uniform, distally directed melt flow into the feed bushing 6.

The molten glass proceeds from the melters 2 through the feed bushing 6 into the diverter 44 and to the fiberizing bushing 28 located below the diverter. The passage of molten glass through the feed bushing 6 requires that the molten glass pass through the plurality of rather small openings in screen members 22, 24 and 32 in order to enter the fiberizing bushing 28. Additionally, the molten glass is funneled into the lower section 40 of feed bushing 6 further mixing the melt as the melt passes along the planar side walls 30 of feed bushing 6 and into the diverter 44. It is to be noted that the lower portion 40 of feed bushing 6 and the top section of diverter 44, respectively, are in communication with one another.

The molten glass then enters the diverter 44 and is directed into the central opening of the fiberizing bushings 28 which is in communication with the canals 42 of the diverter 44. The bottom of the fiberizing bushing 28 is provided with a plurality of orifices 48 through which the molten glass flows and is attenuated into fibers.

While the invention has been described with reference to certain specific embodiments, it is not intended to be limited thereby except insofar as appears in the accompanying claims. Many changes, modifications, variations and other uses and applications of the subject invention will become apparent to those skilled in the art after considering this specification together with the accompanying drawings and claims. All such changes, modifications, variations and other uses and applications which do not depart from the spirit and scope of the invention are deemed to be covered by the invention and may be otherwise embodied within the scope of the following claims.

What is claimed is:

1. A glass fiberizing system comprising:
    at least one melter having a refining section, and further including a plurality of openings located in said refining section through which the glass flows;
    a scallop plate extending from said refining section;
    a feed bushing located below said at least one melter;
    a screen member positioned in said feed bushing, and further including a plurality of openings through said screen member, said screen member communicating with said refining section of said at least one melter such that the glass from said at least one melter flows through said plurality of openings located in said refining section to said plurality of openings in said screen member;
    a diverter communicating with said feed bushing for directing the glass flow from said feed bushing into a fiberizing bushing.

2. A glass fiberizing system as claimed in claim 1 in which said screen member is formed by adjacent V-shape walls.

3. A glass fiberizing system as claimed in claim 1 in which said scallop plate defines a series of partial annular projecting segments wherein said scallop plate creates a substantially uniform distally directed glass flow from said refining section to said screen member.

4. A glass fiberizing system as claimed in claim 1 further comprising a plate member having an opening for receiving said refining section for supporting said at least one melter.

5. A glass fiberizing system as claimed in claim 4 in which said plate member further comprises a probe level stack capable or receiving a temperature detector for measuring the temperature of the glass.

6. A glass fiberizing system as claimed in claim 4 further comprising insulating blocks for supporting and insulating said plate member from said feed bushing.

7. A glass fiberizing system as claimed in claim 6 further comprising cooling members adjacent said insulating block for additional cooling.

8. A high throughput glass fiberizing system comprising:
    a first melter and a second melter, said first and second melter each having a refining section, and further including a plurality of openings located in said refining section through which the glass flows;
    a feed bushing having an upper portion, a mid portion, and a lower portion, said upper portion communicating with said refining section of said first and second melter;
    a first screen member in said upper portion communicating with said first melter and having a plurality of openings through said first screen member;
    a second screen member in said upper portion communicating with said second melter and having a plurality of openings through said second screen member;
    a third screen member in said upper portion and below said first and second screen member and further having a plurality of openings through said third screen member;
    a diverter communicating with said lower portion for directing the glass flow from said feed bushing into a fiberizing bushing.

9. A high throughput glass fiberizing system as claimed in claim 8 in which said first, second, and third screen members are formed by adjacent V-shaped walls.

10. A high throughput glass fiberizing system as claimed in claim 8 in which said diverter comprises at least one canal for directing the glass flow to the fiberizing bushing.

11. A high throughput glass fiberizing system as claimed in claim 8 in which said lower portion comprise generally vertical walls creating a vertical mixing zone for shear mixing of the glass.

12. A high throughput glass fiberizing system as claimed in claim 8 further comprising an insulating material panel structure surrounding said feed bushing, first melter, second melter, and fiberizing bushing.

13. A high throughput glass fiberizing system as claimed in claim 8 in which said first melter and said second melter are electrically heated to maintain the glass at a desired temperature.

14. A high throughput glass fiberizing system as claimed in claim 8 in which said mid portion is beveled to provide an incline to said lower portion.

* * * * *